(12) United States Patent
Fath et al.

(10) Patent No.: US 6,454,826 B2
(45) Date of Patent: Sep. 24, 2002

(54) FILTER CARTRIDGE

(75) Inventors: Jürgen Fath, Weinheim; Dieter Schöttmer, Dortmund, both of (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/810,630

(22) Filed: Mar. 16, 2001

(30) Foreign Application Priority Data

Mar. 17, 2000 (DE) .......................................... 100 13 301

(51) Int. Cl.[7] .............................................. B01D 46/00
(52) U.S. Cl. ............................ 55/490; 55/497; 55/502; 55/507; 55/509; 55/521; 55/DIG. 31
(58) Field of Search ........................ 55/490, 497, 502, 55/509, 507, 521, DIG. 31, DIG. 35

(56) References Cited

U.S. PATENT DOCUMENTS

| 5,472,379 A | * | 12/1995 | Andress et al. ............... 55/502 |
| 5,603,476 A | * | 2/1997 | Merk et al. |
| 5,620,505 A | * | 4/1997 | Koch et al. |
| 5,720,790 A | * | 2/1998 | Kometani et al. |
| 5,902,361 A | * | 5/1999 | Pomplun et al. |
| 6,045,598 A | * | 4/2000 | Fath et al. |
| 6,126,708 A | * | 10/2000 | Mack et al. |
| 6,267,796 B1 | * | 7/2001 | Schottmer |

FOREIGN PATENT DOCUMENTS

DE       195 12 678       11/1996

* cited by examiner

Primary Examiner—David A. Simmons
Assistant Examiner—Minh-Chau T. Pham
(74) Attorney, Agent, or Firm—Kenyon & Kenyon

(57) ABSTRACT

A filter cartridge is made of an accordion fold pack folded in a zigzag-shape. At the end faces (4) of the accordion fold pack, running parallel to the folds, provision is made for the closing elements (5) which include stiffening strips (6), partially covering the accordion fold pack (2), at least on its discharge side, and sealing elements (7) integrally connected to the stiffening strips (6).

16 Claims, 9 Drawing Sheets

FILTER CARTRIDGE

BACKGROUND OF THE INVENTION

The present invention relates to a filter cartridge made of an accordion fold pack folded in a zigzag shape which can be used in a frame in ventilating systems, air-conditioning systems and the like. The design of the accordion fold pack and the choice of the material used for it depends on the filter's technical properties and the required air throughput.

From German Patent 195 12 678 C1, for example, a filter cartridge is known. The filter cartridge in that patent is designed as an accordion fold pack and made of a thermoplastic heat sealable nonwoven fabric. A recurring problem with such filters is sealing it at the frame or housing in which it is set. To solve this problem, the known filter cartridge offers a combined sealing and stiffening bracket, covering the end face of the accordion fold pack. The sealing and stiffening bracket in cross-section, is shaped like a radical (i.e. $\sqrt{}$). The sealing bracket has a V-shaped cross-section, open at the inlet flow side of the medium to be filtered, so that the sealing bracket, under elastic pretension, lies sealingly against the housing. This solution produces good results, but requires additional space at the side. Additional space, during the filtering procedure, is limited. In addition, under certain edge conditions, it turned out that mounting a radical-shape designed sealing and stiffening bracket was a problem.

SUMMARY OF THE INVENTION

The object of the present invention is to create a filter cartridge which is simple in its construction, and which can be inserted into a corresponding frame or housing without difficulty. The filter cartridge should also have the ability to form a good seal at its end faces running parallel to the folds.

In accordance with this object, a filter cartridge built according to the principles of the present invention has an accordion fold pack. The accordion fold pack is provided with closing elements. The closing elements include stiffening strips partially overlapping the accordion fold pack and sealing elements which are integrally connected to the stiffening strips. The stiffening strips are positioned at the end faces of the accordion fold pack, which run parallel to the folds.

During continuous production of accordion fold packs folded in a zigzag shape, the accordion fold packs are cut off to desired lengths. This produces a need to stiffen the end faces of the accordion fold packs and provide them with a sealing element. In order to arrive at the simplified specific embodiment of the sealing element, the stiffening strips are attached at the discharge side of the accordion fold pack. The attachment can be made, for example, using an adhesive or heat sealing procedure, depending upon which kind of material is planned for the closing elements.

In order to influence the flow-through of the filter cartridge as little as possible by the mounting of the stiffening strips at the edge region of the accordion fold pack, the stiffening strips can be developed in a saw tooth manner. It is also possible to use stiffening strips which are hole punched or perforated.

Mounting the stiffening strips on the discharge side of the accordion fold pack allows the sealing elements to be made of sealing flaps directed toward the intake side of the accordion fold pack. The filter cartridge is dimensioned so that the sealing flaps, with their areas adjoining the stiffening strips, fit into an insert opening of a frame or housing, as the case may be, while their areas lying farther out project beyond the insert opening, and are fitted into the opening with a slight press. Their end edges then lie sealingly against the housing wall. Preferably, the height of the sealing flaps is less than the height of filter folds, so that their outer edge can lie sealingly against the housing wall, which, as a general rule, has the same height as that of the folds. On the other hand, the sealing flaps should be dimensioned so that their height is at least 10% of that of the folds, so as to be able to cover a sufficient tolerance between the filter cartridge and the housing.

Depending on the available frame and the material used for the sealing elements, the sealing flaps can be bent convex or concave in their longitudinal direction. This allows higher pressure differences at the filter cartridge and the use of soft materials for the sealing elements. The existing pressure difference can then reinforce the sealing effect.

The sealing elements can also take the form of a hose in an exemplary embodiment. In the simplest solution, the sealing flap, rolled into a hose, can be joined at its outer edge to the stiffening strip. However, for technical production reasons, the sealing elements preferably are made of a slitted, hose-like roll, having a stiffening strip joined at each slit edge. When combining this with the accordion fold pack, the two stiffening strips can then be connected to each other.

In another exemplary embodiment the sealing elements are U-shaped, with their free edges joined to stiffening strips. The stiffening strips are positioned both at the intake side and at the discharge side of the accordion filter pack. This embodiment also allows the flow direction to be changed.

In one embodiment, the stiffening strips and the sealing elements are made of a material of the same strength. They are connected to each other via a connecting fold. The stiffness of the material is chosen so that the filter cartridge is held in the housing or frame in a force locking way. The bending fold permits a minor degree of bending of the sealing element with respect to the stiffening strips.

It is also possible to design a closing element so that the stiffening strips and the sealing elements have a different strength and/or material density. This permits the filter to be adapted to a wide range of predefined conditions. It is also possible to form the stiffening strips and the sealing elements of different materials. Since the accordion fold packs are predominantly made of nonwoven fabrics, a nonwoven fabric is an obvious example material for the closing element. This allows the possibility of representing the filter as being made of uniform components. It is also possible to use thermoplastics as a working material.

BRIEF DESCRIPTION OF THE DRAWINGS

The present invention is explained in detail below, using exemplary embodiments represented in the drawings.

DETAILED DESCRIPTION OF THE INVENTION

Figure 1:
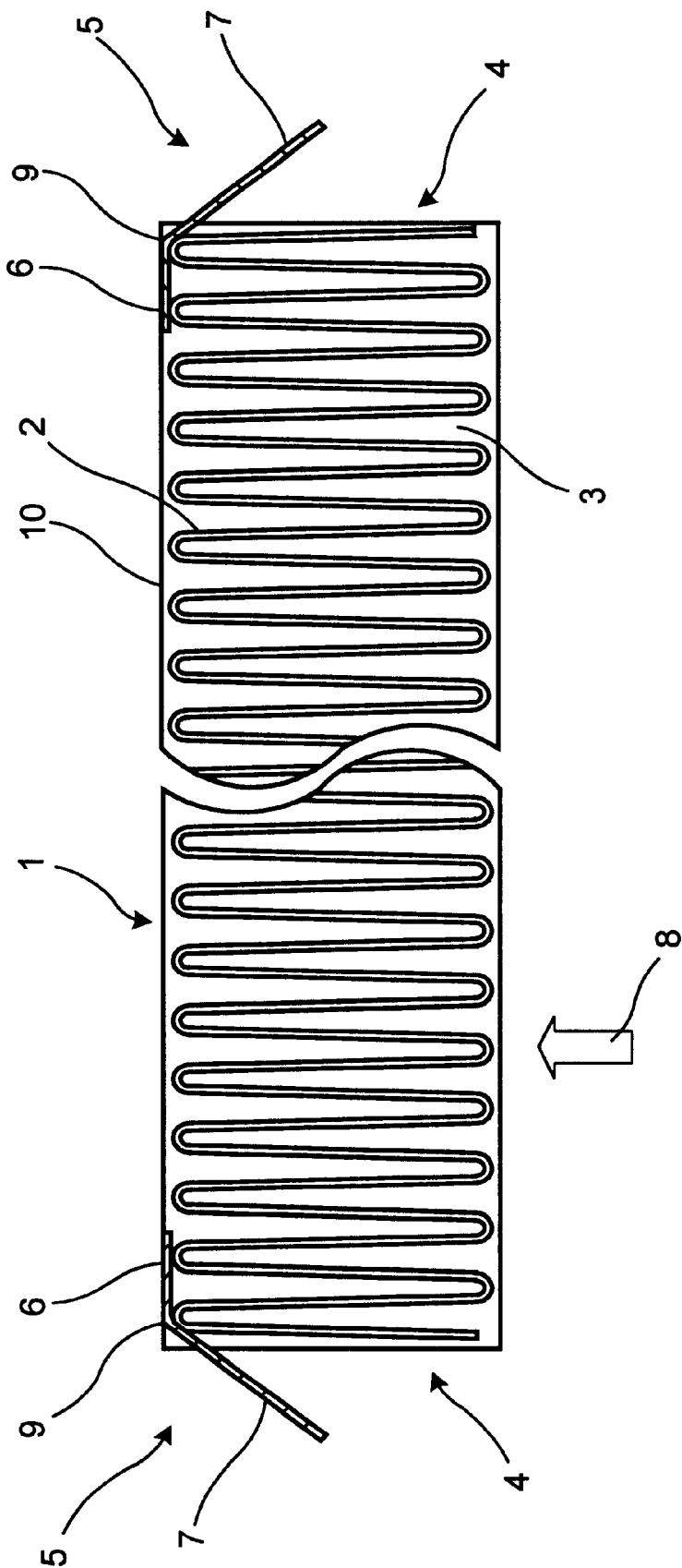
FIG. 1 shows a cross-section through a filter cartridge.

FIG. 1 shows a cross-section of a filter cartridge 1 made of a zigzag-shape folded accordion fold pack 2. The filter cartridge 1 is enclosed on both sides by a seal 3. At an end face 4 of the fold pack 2, closing elements 5 are provided. The closing elements 5 include stiffening strips 6 and sealing elements 7 integrally connected with the latter.

The stiffening strips 6 are fixedly connected to the edge region of the accordion fold pack 2, by, for example, heat sealing or an adhesive. An arrow 8 indicates the direction of air flow through the filter cartridge. The filter cartridge 1 is positioned in a housing, not shown in greater detail, and the sealing elements 7 are then lightly pressed in the direction of the accordion fold pack 2. In order to simplify the movement of the sealing elements 7, a bending fold 9 is provided between the stiffening strips 6 and the sealing elements 7. Such a filter is very simple in its construction and fulfills all the necessary requirements.

Figure 2:
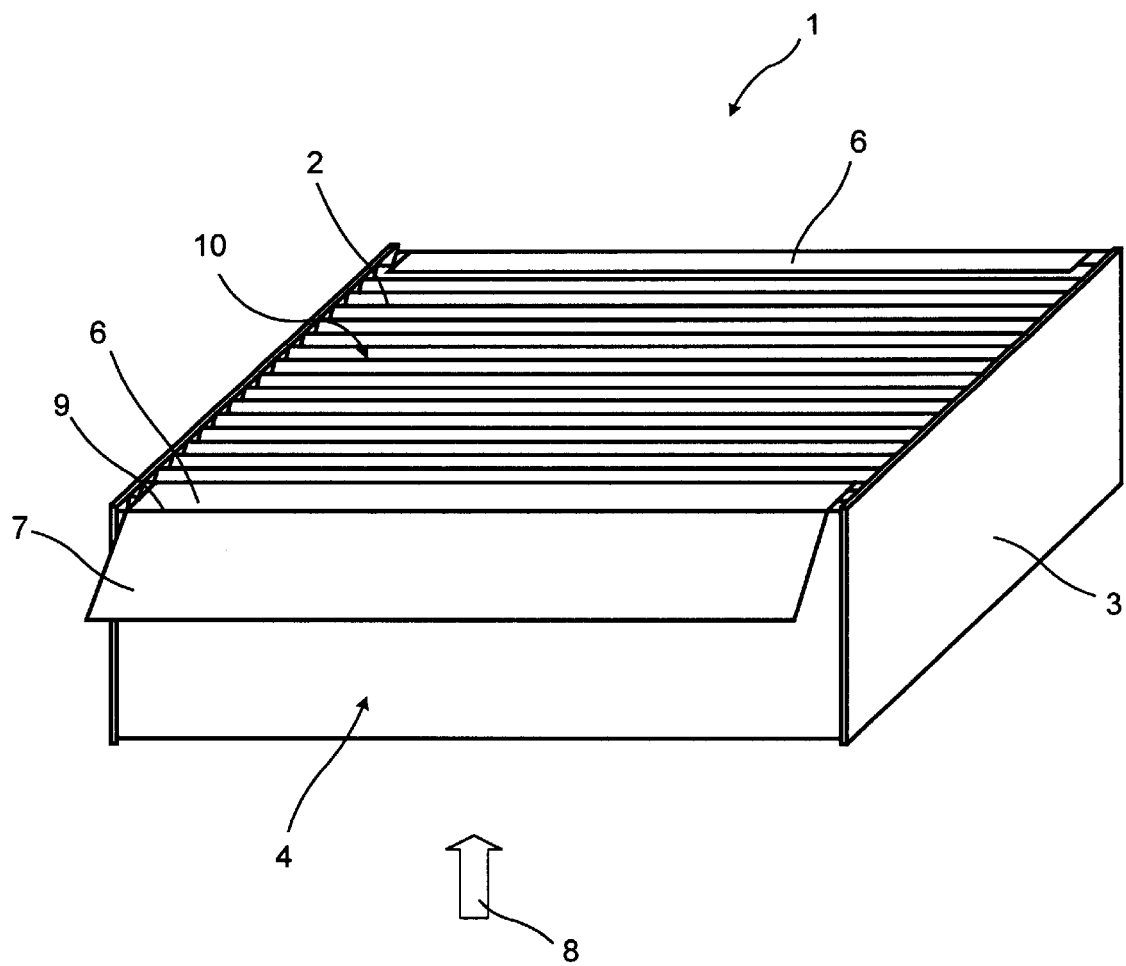
FIG. 2 shows the filter cartridge as in FIG. 1, shown in perspective view.

FIG. 2 shows the filter cartridge 1 in perspective view. The stiffening strips 6 are located on the discharge side 10 of the filter cartridge 1. The sealing elements 7 run parallel to the end faces 4 of the accordion fold pack 2. A seal 3 covers the side surfaces of the accordion fold pack 2. The air stream to be filtered is indicated by an arrow 8.

Figure 3:
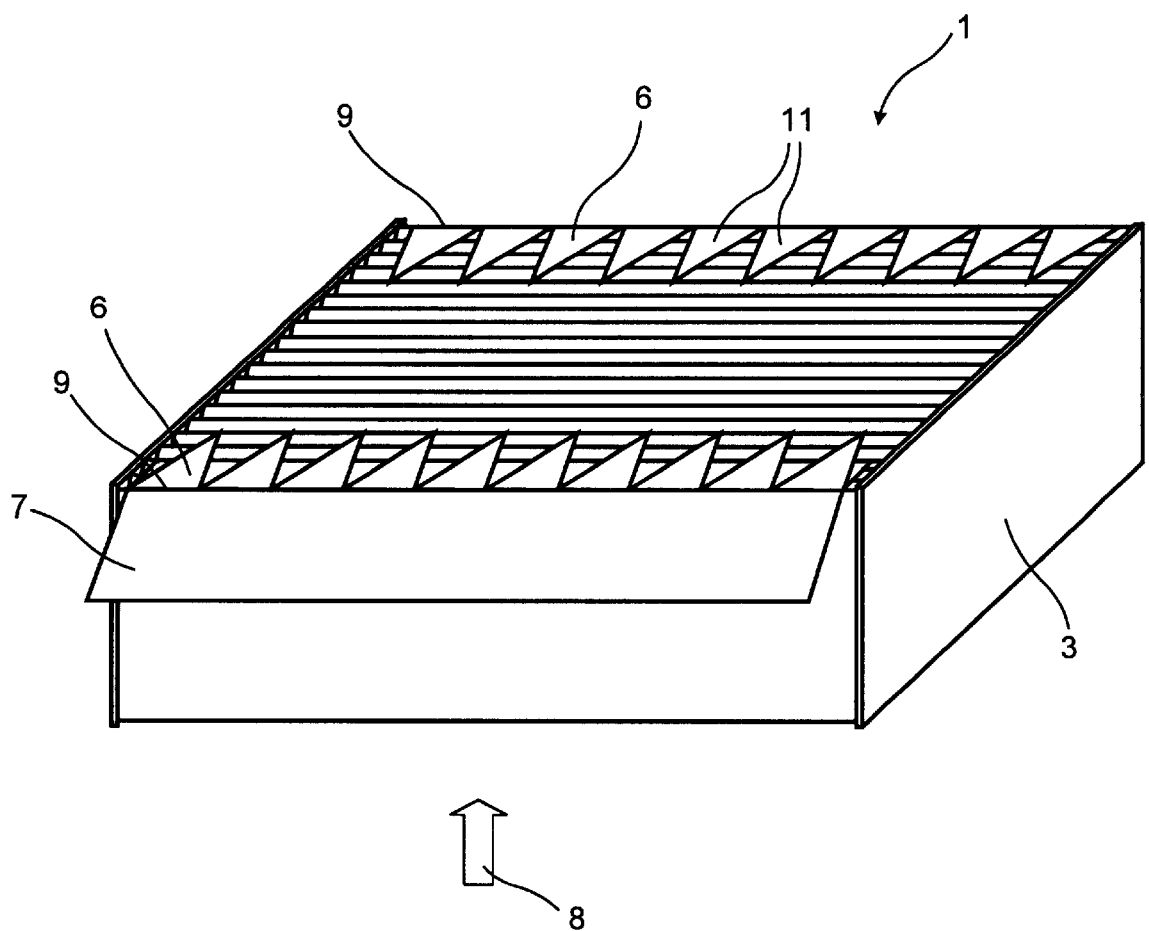
FIG. 3 shows a filter cartridge with sawtooth-like developed stiffening strips in the perspective view.

In FIG. 3, the construction of the filter cartridge 1 is similar to the filter construction of the previous figures, except the stiffening strips 6 are designed sawtooth-like. In this exemplary embodiment, the sawteeth 11 go all the way to the bending fold 9.

Figure 4:
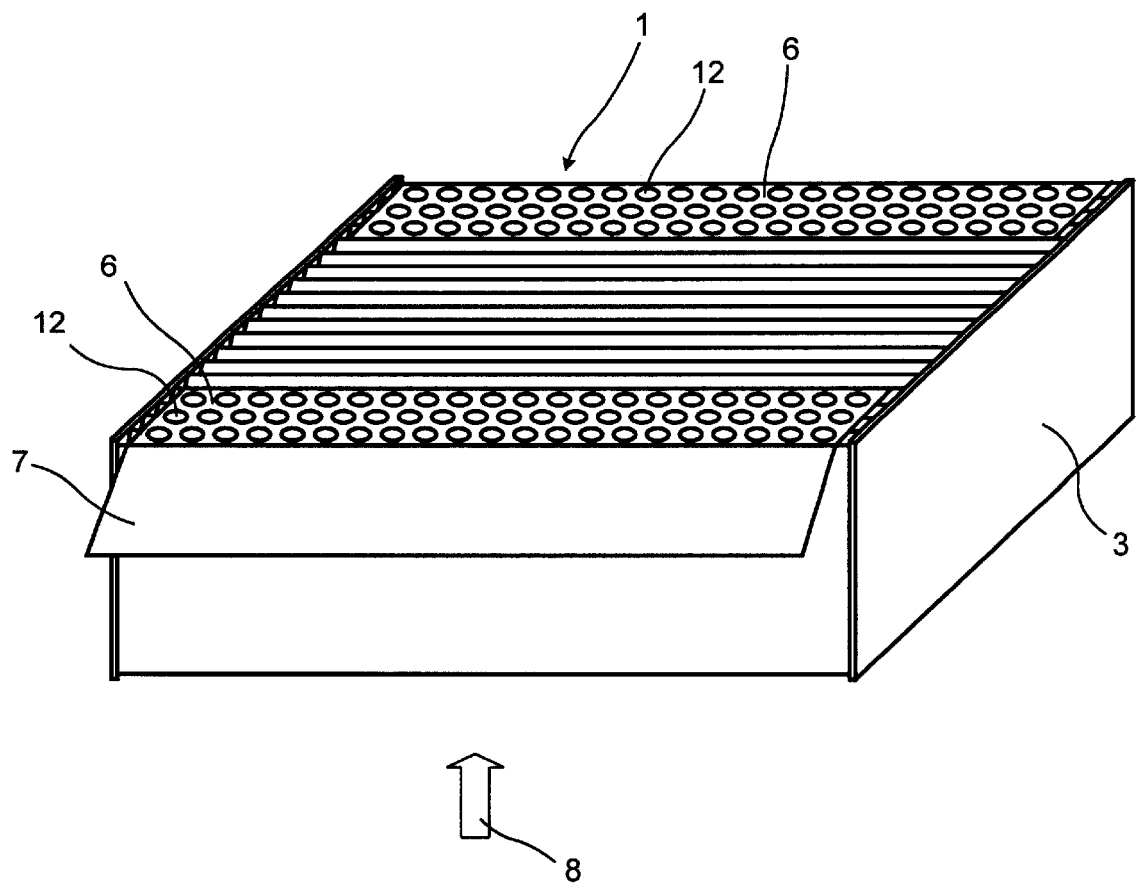
FIG. 4 shows a filter cartridge with perforated stiffening strips.

A further possibility of making the stiffening strips 6 as air-permeable as possible is illustrated in FIG. 4. In FIG. 4, the stiffening strips 6 of the filter cartridge 1 are provided with holes 12.

Figure 5:
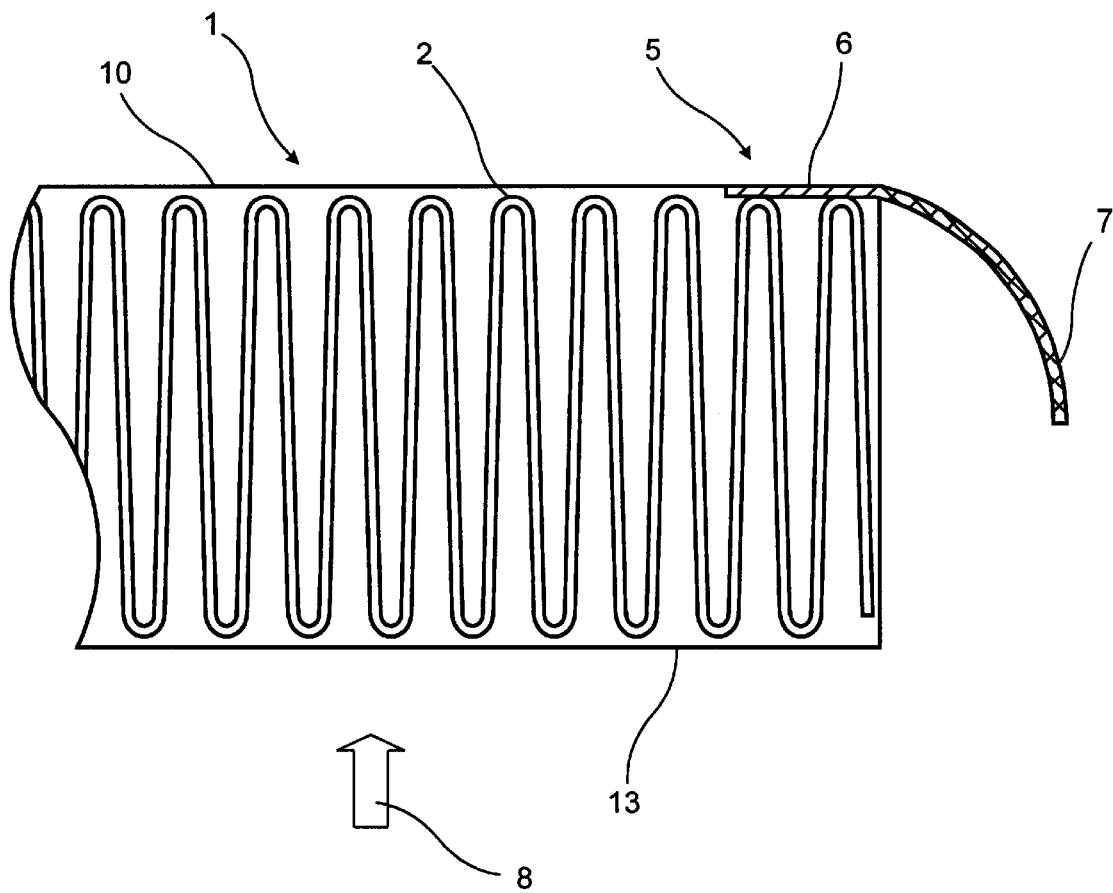
FIG. 5 shows a section of a filter cartridge in cross-section with a convexly bent sealing flap.

In FIG. 5, a section of the filter cartridge 1 is shown enlarged to illustrate in cross-section the positioning and design of the closing element 5. The stiffening strips 6 are positioned on the edge of the accordion fold pack 2, on the discharge side 10 of the filter cartridge 1. The sealing flaps 7, which are aligned concave to an inlet side 13 of the accordion fold pack, are attached to the stiffening strips 6. The stiffening strips 6 and the sealing flaps 7 are made of different materials, which is indicated by the crosshatching. However, the two parts are integrally connected to each other. The stiffening strips 6 and/or the sealing flaps 7 can be made of nonwoven fabric, for example those made of polyester, propylene or polyethylene fibers or filaments. Instead of nonwoven fabrics other planar materials can be used. For example, foils of polypropylene, polyethylene, ABS, PU, TPE or sheet metal made of metallic materials, such as aluminum are suitable.

Figure 6:
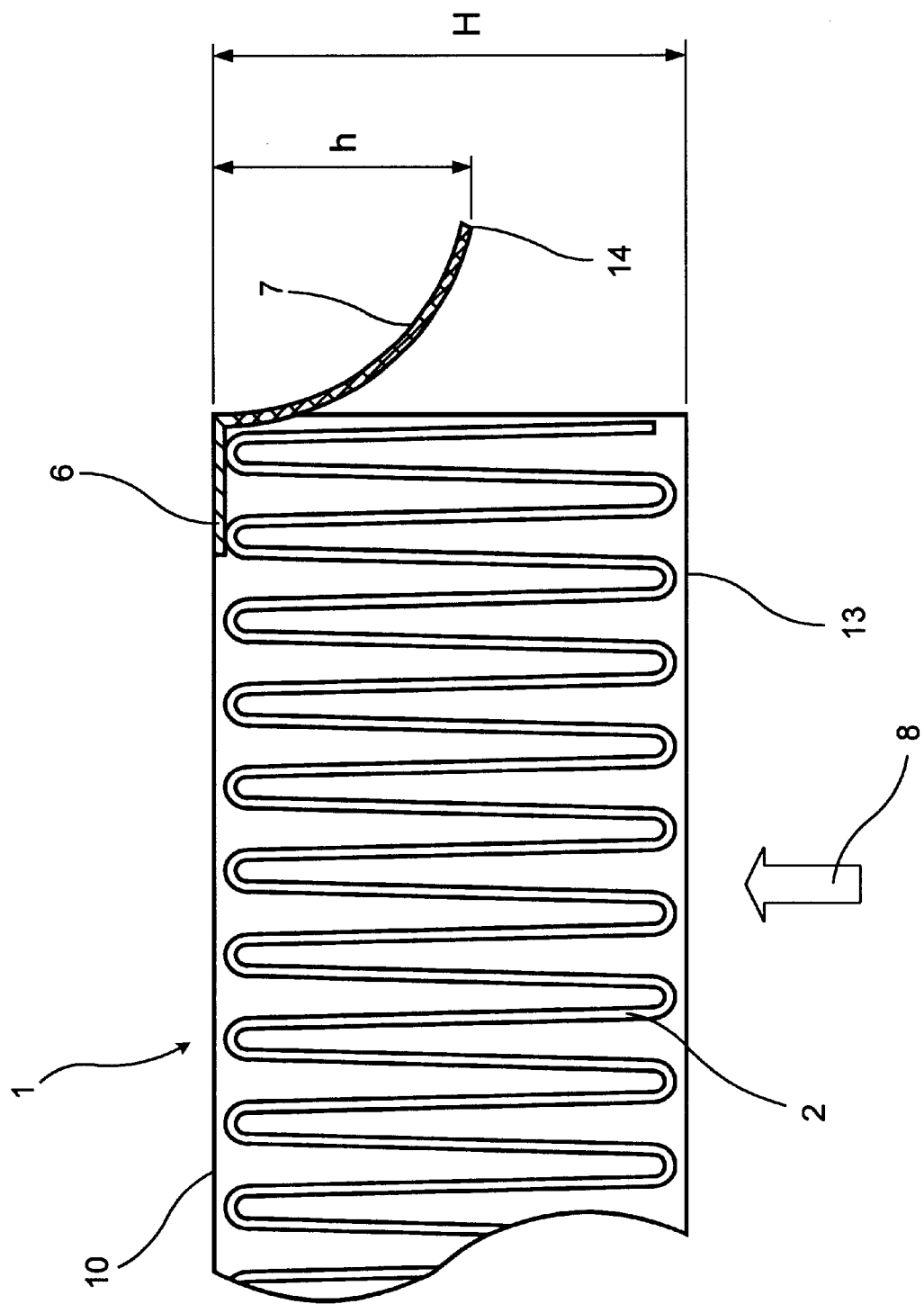
FIG. 6 shows a section of a filter cartridge in cross-section with a concavely bent sealing flap.

FIG. 6 shows another exemplary embodiment which is similar to the embodiment shown in FIG. 5. In the embodiment of FIG. 6, however, the sealing flaps 7 are designed to be convex to the intake side 13 of the accordion fold pack 2. This makes for a stronger lip seal by the edges 14 of the sealing flaps 7 at the housing wall.

In all the specific embodiments of FIGS. 1 to 6, the height h of the sealing flaps 7 is chosen to be less than the height H of the folds of the accordion fold pack 2. This provides as favorable as possible a sealing at the housing wall, which is not shown in greater detail. However, the height h of the sealing flaps is at least 10% of the height H of the folds.

Figure 7:
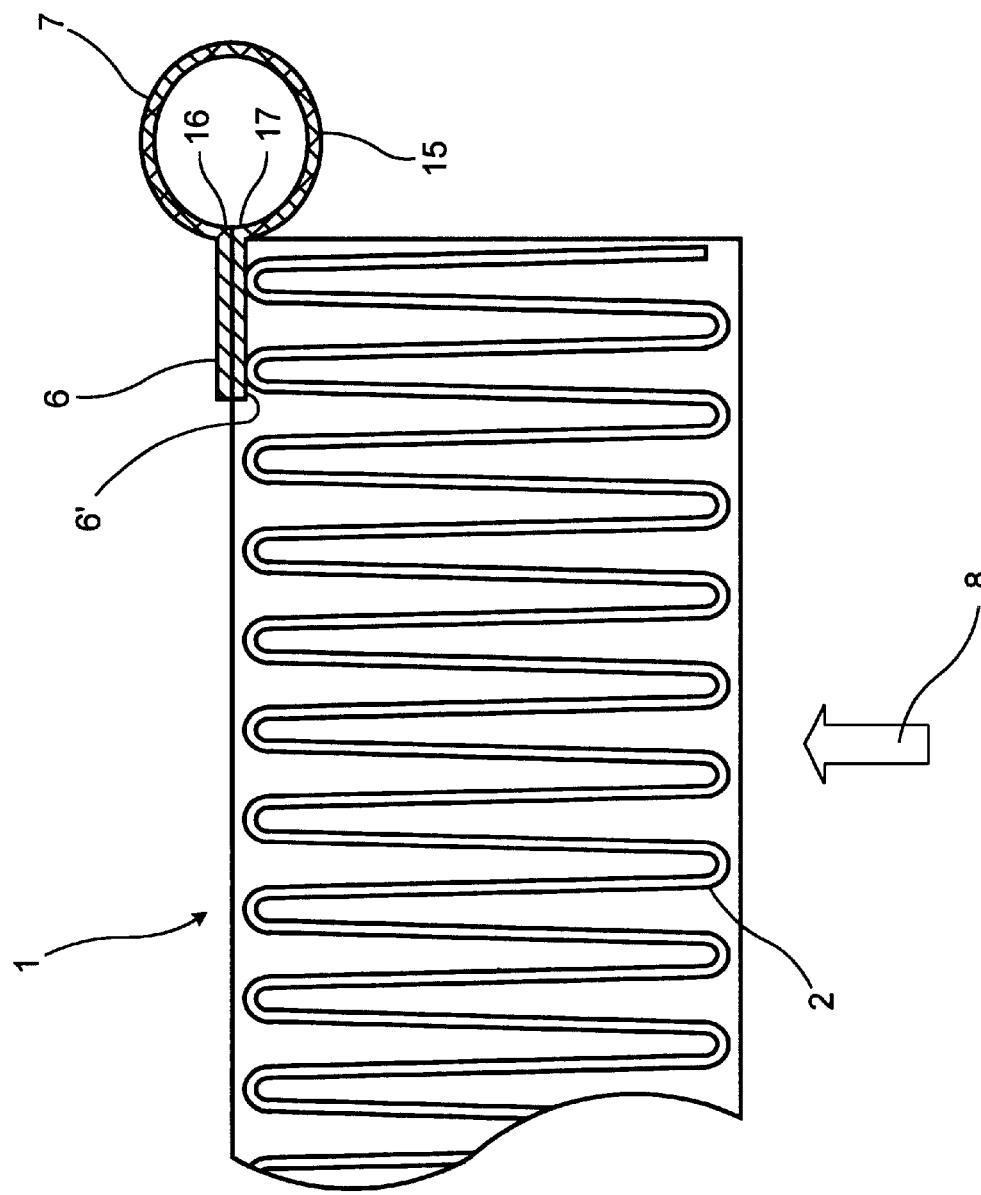
FIG. 7 shows a filter cartridge with a sealing element made from a hose-like roll, in cross-section.

In FIG. 7, the attachment of a sealing flap 7, designed hose-like, is shown in cross-section. The sealing element 7 is formed from a slitted, hose-like roll 15, and the slit edges 16 and 17 of the roll 15 are each connected to a stiffening strip 6, 6'. The stiffening strips 6, 6' are fixedly connected when they are fixed to the accordion fold pack 2, for instance, by heat sealing.

Figure 8:
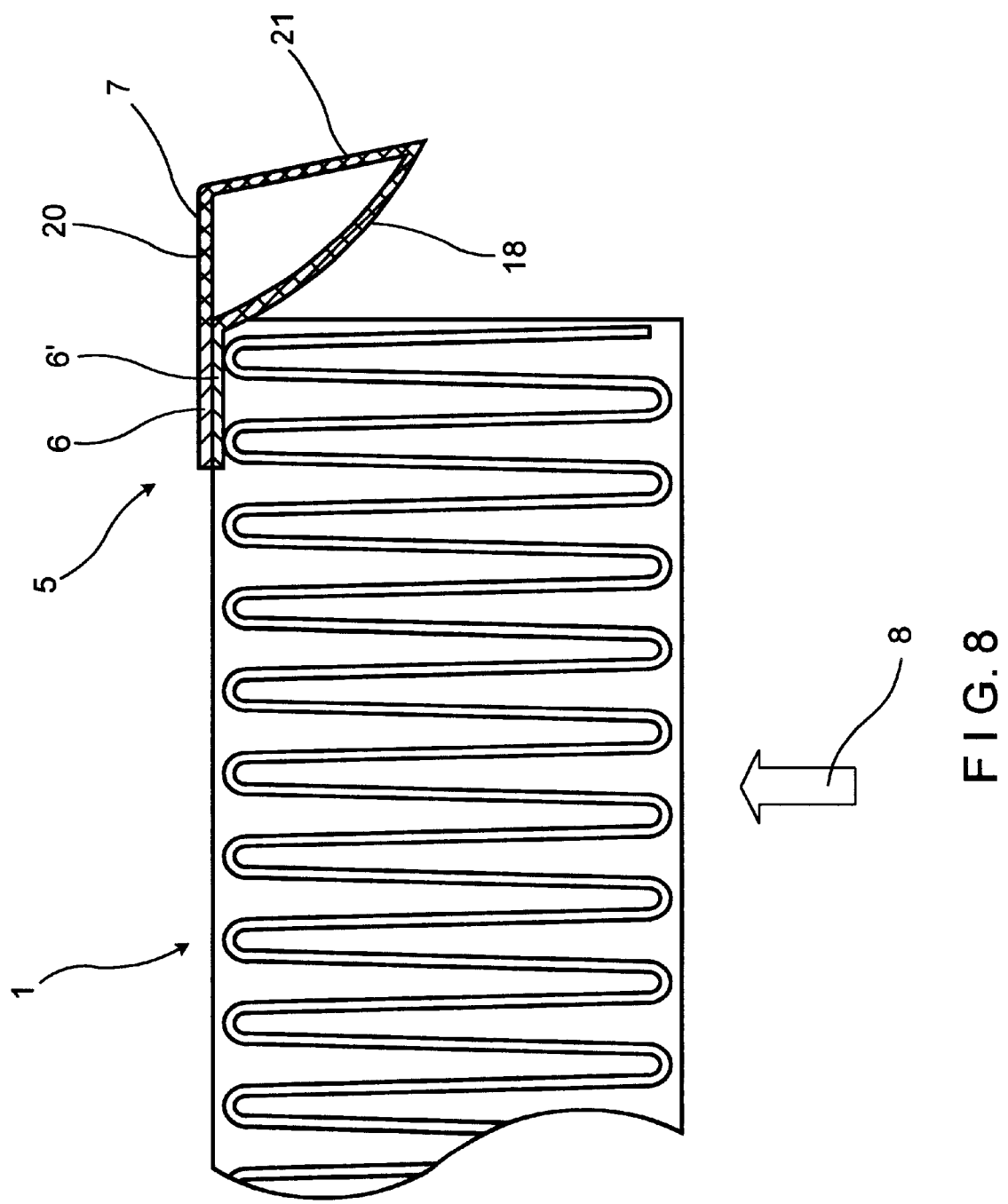
FIG. 8 shows a filter cartridge in cross-section with a sealing element as a hollow body and FIG. 9 shows a filter cartridge in cross-section with a U-shaped sealing element.

Instead of the roll 15, another hollow form can also be selected for the sealing element 7. Thus, FIG. 8 shows in cross-section a triangular design of a hollow form. This is advantageous when great stiffness is desirable for the closing element 5. The concavely bent wall 18 of the hollow form can be regarded as a sealing flap which is strengthened in its stiffness by the walls 20 and 21 standing at an angle to one another.

Figure 9:
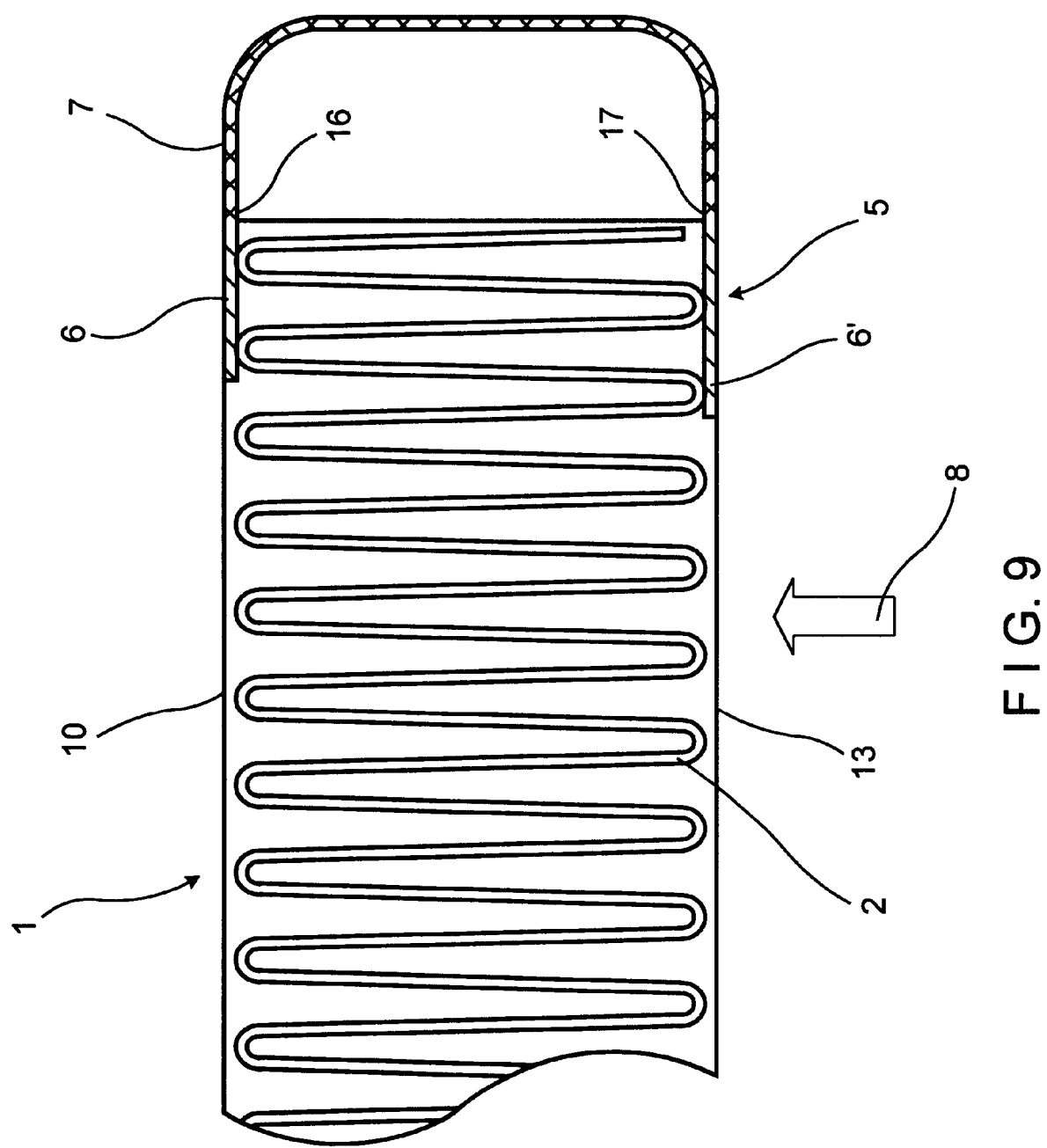

Another embodiment of a closing element 5 is shown in FIG. 9. In this embodiment the sealing element 7 is U-shaped, and its free edges 16 and 17 are connected to first and second stiffening strips 6, 6'. The first stiffening strip 6 is affixed to the upper side of accordion fold pack 2, as seen in the drawing, while the second stiffening strip 6' lies on the lower side. With this design of the sealing element 7 the flow-through direction of the filter cartridge 1 is of subordinate importance, so that this filter cartridge 1 can be installed the other way round in the housing or frame.

What is claimed is:

1. A filter cartridge comprising:
an accordion fold pack folded in a zigzag shape, the accordion fold pack having end faces running parallel to the folds,
closing elements which include stiffening strips partially covering the accordion fold pack and attached to a plurality of the end faces, at least on a discharge side of the fold pack, and sealing elements comprising sealing flaps integrally connected to the stiffening strips, the end faces of the accordion fold pack being adapted to receive the closing elements.

2. A filter cartridge comprising:
an accordion fold pack folded in a zigzag shape, the accordion fold pack having end faces running parallel to the folds,
closing elements which include stiffening strips partially covering the accordion fold pack, at least on a discharge side of the fold pack, and sealing elements integrally connected to the stiffening strips, the end faces of the accordion fold pack being adapted to receive the closing elements, wherein the stiffening strips have a sawtooth-shaped form.

3. A filter cartridge comprising:
an accordion fold pack folded in a zigzag shape, the accordion fold pack having end faces running parallel to the folds, closing elements which include stiffening strips partially covering the accordion fold pack, at least on a discharge side of the fold pack, and
sealing elements integrally connected to the stiffening strips, the end faces of the accordion fold pack being adapted to receive the closing elements, wherein the stiffening strips are perforated.

4. The filter cartridge as recited in claim 1, wherein the sealing elements comprise sealing flaps directed toward an intake side of the accordion fold pack.

5. A filter cartridge comprising:
an accordion fold pack folded in a zigzag shape, the accordion fold pack having end faces running parallel to the folds, closing elements which include stiffening strips partially covering the accordion fold pack, at least on a discharge side of the fold pack, and sealing elements integrally connected to the stiffening strips, the end faces of the accordion fold pack being adapted to receive the closing elements, wherein the sealing elements comprise sealing flaps directed toward an intake side of the accordion fold pack and the sealing flaps are bent convexly or concavely in their longitudinal direction.

6. The filter cartridge as recited in claim 4, wherein a height of the sealing flaps is at least 10% of a height of the folds of the accordion fold pack.

7. A filter cartridge comprising:

an accordion fold pack folded in a zigzag shape, the accordion fold pack having end faces running parallel to the folds, closing elements which include stiffening strips partially covering the accordion fold pack, at least on a discharge side of the fold pack, and sealing elements integrally connected to the stiffening strips, the end faces of the accordion fold pack being adapted to receive the closing elements, wherein the sealing elements have a hose-shaped design.

8. The filter cartridge as recited in claim 7, wherein the sealing elements are made of a slitted, hose-shaped roll, each of the slit edges having a stiffening strip connected to it.

9. A filter cartridge comprising:

an accordion fold pack folded in a zigzag shape, the accordion fold pack having end faces running parallel to the folds, closing elements which include stiffening strips partially covering the accordion fold pack, at least on a discharge side of the fold pack, and sealing elements integrally connected to the stiffening strips, the end faces of the accordion fold pack being adapted to receive the closing elements, wherein the sealing elements have a U-shaped form and are connected with their free edges to the stiffening strips, each of the stiffening strips being positioned on one side of the accordion fold pack.

10. The filter cartridge as recited in claim 1, wherein the stiffening strips and the sealing elements have a different strength and material density. strips and the sealing elements have a different strength and/or material density.

11. The filter cartridge as recited in claim 1, wherein the stiffening strips and the sealing elements are made of different materials.

12. The filter cartridge as recited in claim 11, wherein one of the different materials is a nonwoven fabric.

13. The filter cartridge as recited in claim 11, wherein one of the different materials is a thermoplastic.

14. The filter cartridge as recited in claim 1, wherein the stiffening strips and the sealing elements are connected to each other via a bending fold.

15. The filter cartridge as recited in claim 1, wherein the stiffening strips and the sealing elements have a different strength or material density.

16. The filter cartridge as recited in claim 1, wherein the sealing flaps each have a uniform thickness.

* * * * *

UNITED STATES PATENT AND TRADEMARK OFFICE
CERTIFICATE OF CORRECTION

PATENT NO.    : 6,454,826 B2
DATED         : September 24, 2002
INVENTOR(S)   : Fath et al.

It is certified that error appears in the above-identified patent and that said Letters Patent is hereby corrected as shown below:

<u>Column 6,</u>
Lines 13-14, after "density." delete "strips and the sealing elements have a different strength and/or material density.".

Signed and Sealed this

Twenty-second Day of July, 2003

JAMES E. ROGAN
*Director of the United States Patent and Trademark Office*